May 29, 1951 O. B. JACOBS 2,554,828

TESTING REPEATERS IN TRANSMISSION SYSTEMS BY SHUNTING OUT INDIVIDUAL REPEATERS

Filed July 7, 1947

INVENTOR
O. B. JACOBS
BY N. S. Ewing
ATTORNEY

Patented May 29, 1951 2,554,828

UNITED STATES PATENT OFFICE 2,554,828

TESTING REPEATERS IN TRANSMISSION SYSTEMS BY SHUNTING OUT INDIVIDUAL REPEATERS

Oliver B. Jacobs, Morristown, N. J., assignor to Bell Telephone Laboratories, Incorporated, New York, N. Y., a corporation of New York Application July 7, 1947, Serial No. 759,319

16 Claims. (Cl. 179—175.31)

Figures 1, 2:
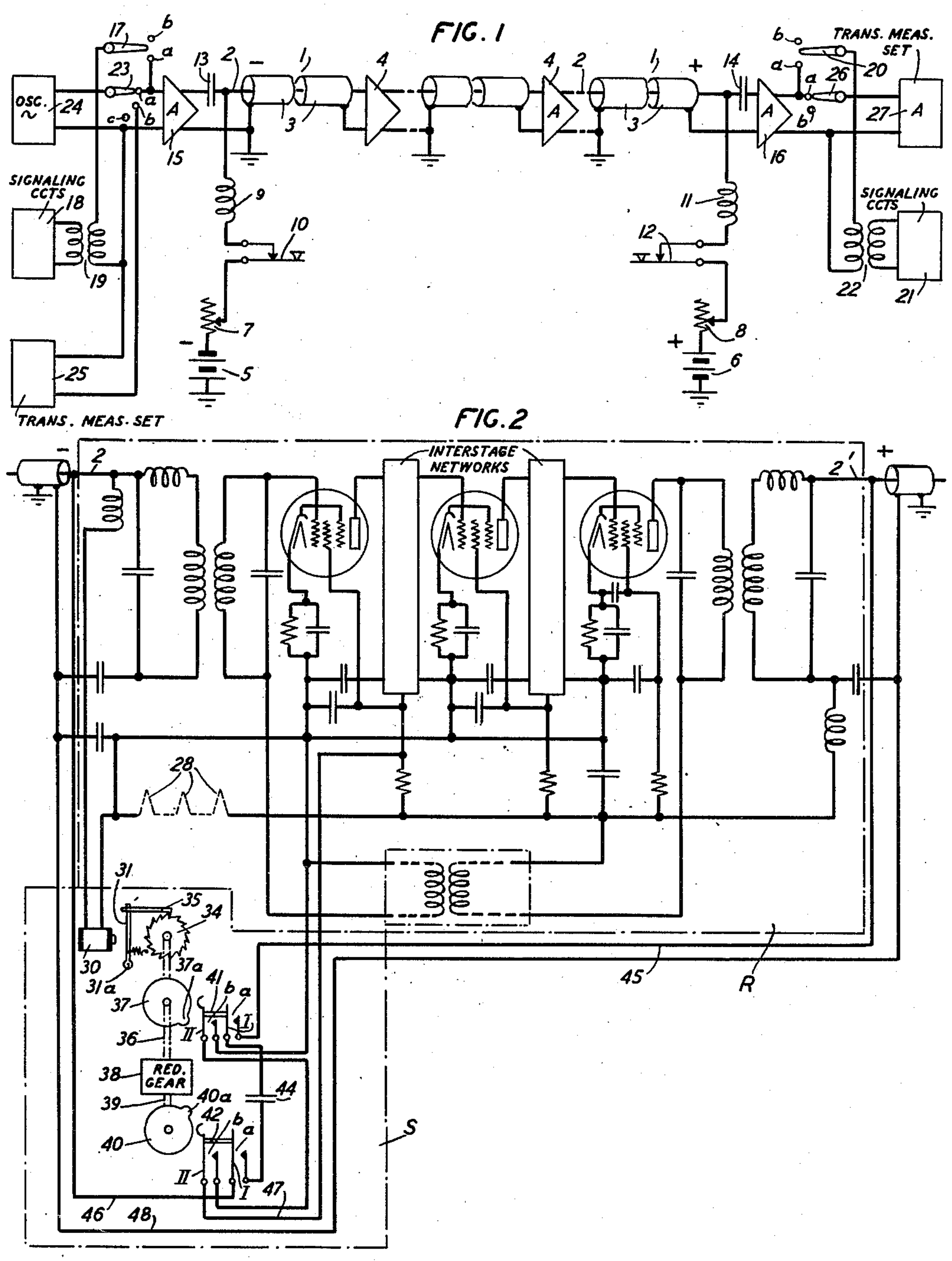

This invention relates in general to the testing of repeatered electrical transmission systems. More particularly, it relates to the identification and test of faulty repeaters in repeatered submarine cable signalling systems.

Certain problems arise in the maintenance of extended buried or submarine cable systems because the elements of such systems are ordinarily inaccessible for test purposes. Inasmuch as all tests must be made from the terminal or intermediate control stations, it is particularly difficult to distinguish between faulty and normally operating repeaters. Moreover, in an extended cable system which is subject to constant use, it is desirable to make provision for testing each of the repeaters of the system from time to time.

It is therefore the principal object of this invention to provide means and methods for checking the operation of repeaters comprising vacuum tube amplifiers in an electrical transmission system in a simpler and more satisfactory manner than provided heretofore.

In accordance with the present invention, this object is carried out by providing stepper selectors at each of a plurality of repeater circuits of an electrical transmission system which are driven in synchronism in response to successive momentary interruptions in the repeater energizing current from a terminal or other control station.

Each selector, after responding to a number of interruptions which may be different for each repeater circuit, causes its respective repeater to be effectively shunted out of the signaling circuit. This is brought about by relay operation at the selected repeater to connect together the incoming and outgoing circuits thereat. Such an arrangement has the advantage of effectively eliminating the selected repeater from the main signaling circuit without requiring series contacts in the normal repeater circuit which might impair its operation. Since such a shunting connection between the repeater output and input may permit feedback causing self-oscillation in the strapped-out repeater, it is desirable under control of selector operation to provide circuit connections at the same time the shunting connection is made to prevent such oscillation. At the cable terminal stations, the performance of the system is tested with and without each of the respective repeaters in the circuit to obtain information regarding the performance, e. g., the gain, modulation characteristics, and noise level, of each of the repeaters.

In accordance with a particular embodiment which is assumed by way of illustration to operate in a submarine cable signaling system, the selector device in each of the repeater circuits comprises a magnet, the winding of which is in series with the circuit that supplies the energizing current to the component vacuum tubes. The armature of the magnet actuates a ratchet-and-pawl device which is connected to cause the step-wise rotation of cams provided with contact-closing projections, one of which cams is adapted to turn one-hundredth of a revolution while the other turns one-tenth of a revolution each time the cable system is energized by direct current power from the terminals. Thus, in a given repeater, only one position in a hundred is adapted to bring about the test condition in which the repeater is strapped out of the system. In a 50-repeater system, for example, the system may be designed so that each repeater will be in the test condition after a different even number of applications of energizing current. Conventional transmission test sets are connected at the cable terminals for observing the changes in noise level, the gain, and the modulation characteristics with successive repeaters strapped out, the observed changes being attributable to the strapped-out repeater.

A particular feature of such a system is that the selectors in successive repeater circuits may be so designed that during odd numbers of applications of power none of the repeaters is strapped out of the system, thus permitting periods of normal operation of the system to alternate with test intervals.

Another feature of the system is that no contacts are included in the normal repeater circuit.

Other objects and features of the present invention will be apparent from a study of the detailed description hereinafter and the drawing, in which:

Fig. 1 shows a repeatered submarine cable system in accordance with the present invention; and Fig. 2 is a detailed view of the circuits comprising one of the repeater stations 4 of Fig. 1, including the associated selector mechanism in accordance with the present invention.

For the purposes of illustration, the present invention will be described as specifically adapted for use in an extended undersea cable system for the transmission of speech and telegraph signals. However, it will be apparent that the principles of this invention may be applied to electrical transmission systems of other types and constructions; and that the practice of this invention is not limited to the particular system or the particular apparatus and mechanical structures disclosed herein.

Referring to the drawing, Fig. 1 discloses an extended submarine cable system including a large number of repeaters which are subject to be successively tested in accordance with the present invention. In structural detail, the submarine cable system may be assumed to be broadly similar to the system disclosed in United States Patent No. 2,020,297 granted November 12, 1935 to O. E. Buckley et al.

The submarine cable 1 comprises a plurality of sections, each having an inner conductor 2 and a grounded outer conductor 3, which are connected in series through the repeater stations 4, details of which are shown in Fig. 2 of the drawing, which will be discussed hereinafter.

The cathode heater circuits in the repeater stations 4 are connected in series with the inner cable conductors 2. Current to energize the heaters is derived from the direct current source 5 at the western terminal of the cable, the negative terminal of which is connected to the central cable conductor 2 through the adjustable rheostat 7 and the choke coil 9. Current is also supplied from the direct current source 6 at the eastern cable terminal, the positive terminal of which is connected to the inner conductor 2 through the adjustable rheostat 8 and the choke coil 11. The switches 10 and 12, respectively connected in series with the energizing circuits at the eastern and western terminals of the cable 1, provide for interruption of the heater current from either terminal at the will of an operator.

Although Fig. 1 shows the respective power sources 5 and 6 at each of the cable terminals, the system would operate satisfactorily with a single source having double the potential located at either one of the terminals.

During normal operation while speech and telegraph signals are transmitted over the cable system the switch 23 at the western terminal is in disconnected position 23*c*; and the switch 17 is in connected position 17*a*. Thus, the conventional transmitting circuits 18 are connected through the transformer 19 and the amplifier 15 to the central conductor 2 of the cable system 1 through the series-connected blocking condenser 13. Likewise, at the eastern end of the cable system, during conventional operation the switch 26 is in disconnected position 26*b*, and the switch 20 is in connected position 20*a*. This connects the conventional receiving circuits 21 through the transformer 22, the amplifier 16, and the series-connected blocking condenser 14 to the central conductor 2 of the cable 1.

For the purposes of testing the cable system, the switch 17 at the western cable terminal and the switch 20 at the eastern cable terminal may be positioned on their respective disconnect contacts 17*b* and 20*b*. At the western terminal of the cable 1 there are provided the conventional oscillator circuit 24, the transmission measuring set 25, and the three-way switch 23, having contacts 23*a*, 23*b* and 23*c*. Through the contact 23*a* the output of the oscillator 24 may be connected to the cable terminals through the amplifier 15; and through the contact 23*b*, the output of the oscillator 24 may be connected directly to the transmission measuring set 25. At the eastern cable terminal, there is provided the transmission measuring set 27, and the two-way switch 26, having contacts 26*a* and 26*b*, the contact 26*a* adapted to connect the transmission measuring set 27 to the cable terminals through the amplifier 16. The transmission measuring sets 25 and 26 are substantially identical, and may be of the type described in an article entitled "Measuring system for carrier circuits" by S. Rosen, Bell Laboratories Record, vol. 19, May 1941, page 277.

Fig. 2 of the drawing is a detailed circuit diagram of one of the repeater stations 4 of Fig. 1. The circuits included in the dotted enclosure marked R represent a repeater of a type suitable for use in long submarine cable systems, which includes three pentode tube stages with suitable interstage networks, such as shown in Fig. 2 of my Patent 2,342,544, of February 22, 1944, and described with reference thereto.

Associated with the repeater circuit R at each of the repeater stations 4 of Fig. 1, is a selector mechanism S, which is adapted to respond at each of the repeater stations to a different preselected number of interruptions in the heater energizing current to connect a shunting circuit around the said repeater and make a connection therein to prevent oscillation of the repeater during such shunting connection.

The selector circuit S includes the electromagnet 30 which is connected in series with the cathode heater circuits 28. The design of the magnetic device 30 should be such that mechanical shocks will not cause false operation or damage. Assuming that a supply current of, for example, 250 milliamperes flows from the cable conductor 2 through the heater circuits, a potential drop of 5 or 6 volts may be necessary to operate the electromagnet 30 to make the desired contacts.

Responsive to the magnet 30, is the armature 31, which is connected to rotate in the direction of the magnet 30 about the pivot 31*a* and against the pull of the spring 32. The other end of the armature 31 is hinged to one end of the pawl 35, which is adapted to engage successive teeth of the ratchet 34, causing it to rotate step-wise in a counter-clockwise direction. A shaft rigidly attached to the center of the ratchet 34 serves to communicate its step-wise rotational motion to the cam 37, which is also rigidly mounted on the shaft 36. The cam 37, which as a protuberance 37*a* positioned to actuate armatures I and II of the switch 41 to respectively engage their *a* and *b* contacts at a certain point in its rotation, may be designed, for example, to complete one rotation every tenth time the magnet 30 actuates its armature 31. An extension of the shaft 36 serves to communicate the motion of the ratchet 34 and the cam 37 to a reduction gear 38, and hence, at reduced rotational speed, to a shaft 39 which is rigidly connected to rotate another cam 40. The reduction gear 38 may be designed, for example, so that during one step the cam 40 rotates only one-tenth as far as the cam 37, making one complete rotation while the cam 37 makes ten rotations; that is, the cam 40 makes one rotation for every 100 times the magnet 30 actuates its armature 31. The cam 40 is provided with a protuberance 40*a* which is adapted to actuate armatures I and II of the switch 42 to simultaneously engage their *a* and *b* contacts respectively.

In a cable system containing only a few repeaters it is practicable to use a single cam. When the number of repeaters is large, the movement of a single cam for a single step may not be sufficient to insure that a contact will not be made on adjacent steps. The provision of two cams and associated switches, with reduction gear between the cams, insures that the complete connections will not be established on steps adjacent or near the desired step.

The armatures of switches 41 and 42 are so adapted, that when both switches are operated by the action of the cams 37 and 40, the incoming and outgoing central conductors 2 and 2′ are connected to each other through condenser 44, shunting the alternating current signaling path of the repeater circuit R out of the cable system. This is brought about by the following circuit arrangements. The incoming central conductor 2 is connected through the lead 46 to the armature I of the switch 42 adapted to engage the *a* contact thereof; the *a* contact of the switch 42 is connected through the condenser 44 to the armature I of the switch 41 adapted to engage the *a* contact of switch 41. The *a* contact of the switch 41 is connected to the lead 45, which feeds into the outgoing central conductor 2′. Condenser 44 is provided to prevent short-circuiting the direct current path through magnet 30.

Circuit arrangements are also provided so that simultaneously with the foregoing, the switch 42 connects a signal current cut-off circuit in the first stage of the repeater R which prevents oscillation during the interval in which the repeater R is strapped out of the cable system. This is brought about by a connection from the plate circuit of the first amplifier stage through the lead 47 to the armature of the switch 42. The armature II of switch 42 is adapted to engage the *b* contact thereof which is connected through the armature II and contact *b* of switch 41 to the lead 48. The lead 48 is connected to the cathode circuit of the first stage. The connection described prevents transmission through the first amplifier stage by virtue of the fact that the plate circuit and cathode are brought to the same potential.

Assume, as suggested hereinbefore, that the system under description comprises 50 repeaters, and that the cams 37 and 40 have a respective rotational ratio of ten to one. There will then be only one position out of 100 in each of the stepper-selector mechanisms in respective repeater circuits in which the cams 37 and 40 will be simultaneously in position to actuate switches 41 and 42, thereby bringing about the test condition in which the repeater is strapped out of the cable circuit and the anti-oscillation circuit is also connected. Moreover, if the repeater system is installed with the test devices set initially so that each repeater will be in the test condition after a different even number of applications of energizing current, every odd number of applications will produce normal operating conditions whereby all of the repeaters will be included in the system. Any particular repeater may thus be strapped out of the system by turning the energizing current to zero and back to normal the proper number of times.

Assume that a desired repeater is to be tested. Either the switch 10 at the western cable terminal or the switch 12 at the eastern cable terminal or both are depressed and released by their respective operators a given number of times corresponding to the code number of the particular repeater selected. Operation of the magnetic stepping devices in the repeaters does not require rapid pulses. Preferably, the current should be gradually reduced to zero by coordinated actions of the operators at both terminals, and then increased to somewhat above normal, again being reduced to normal for each step. This insures positive operation. Moreover, the interruptions of the energizing current should be brief enough that the temperature of the cathodes of the tubes does not undergo substantial change.

The above-described operation momentarily interrupts the energizing current in the selector magnets 30 in each of the selector circuits S, causing each of the ratchets 34 to operate through the desired number of steps. At the selected repeater circuit, but at none other, cams 37 and 40 will be thereby positioned so that their protuberances 37*a* and 40*a* actuate the respective switches 41 and 42 to engage their contacts thereby strapping the repeater out of the cable system by connecting the leads 45 and 46, and simultaneously connecting the leads 47 and 48 to prevent oscillation.

To further condition the system for testing, the switch 17 at the western cable terminal is positioned on its disconnect contact 17*b*, and the switch 20 at the eastern cable terminal is positioned on its disconnect contact 20*b*, thereby disconnecting the transmitting and receiving circuits at the respective terminals.

In order to make noise level measurements the transmission measuring set 27 at the eastern cable terminal is connected to receive the output of the system through the *a* contact of the switch 26. Data is recorded on the noise received when no tone is transmitted over the system. This is compared to a similar reading when the preceding repeater is strapped out instead of the repeater formerly selected, the latter being restored to the system, whereby the noise level of the latter repeater may be determined. A repeater which contributes enough noise to increase the total system noise materially may be located by observing the relative magnitude of the change in noise level in the transmission measuring set 27 at the receiving station as successive repeaters are strapped out.

The gain of a repeater under test may be measured by the following operational steps. The oscillator 24 is adjusted to produce a tone of given frequency. The intensity of the test tone is first measured by connecting the output terminals of the oscillator 24 at the western cable terminal directly to the transmission measuring set 25 through the *b* contact of the switch 23. The switch 23 is then positioned on its *a* contact, and the test tone impressed on the cable system, the output of which is measured at the eastern cable terminal by means of the transmission measuring set 27. Similar measurements are made with the test repeater restored to the system. Measurements are made at different frequencies, throughout the transmission range. The difference between the overall transmission of test frequencies, with and without the test repeater in the system, will give the net gain characteristics of the repeater under test, after making correction for the known loss due to the shunting effect of the strapped-out repeater. Moreover, tests of this type may be utilized to determine the change in tube efficiency in the respective repeaters, by comparing data recorded from gain tests made when the system is first installed with data recorded from similar tests made from time to time thereafter. This has the advantage of enabling deterioration of tube activity in any repeater to be detected before the system performance is seriously affected, whereby preparation may be made to replace an impaired repeater at an opportune time.

Another type of test enables those repeaters to be located which are causing excessive modulation in the cable system. In accordance with this test, two tones, of such frequencies as are known to give strong interference, as determined with the circuit in normal operating condition, are transmitted over the cable system from the oscillator 24. One repeater after another is strapped out, and the strength of the modulation products in each case is measured by means of the transmission test set 27 at the eastern terminal of the cable. The test level will be high at repeaters on the transmitting side of the strapped-out repeater, and low on the receiving side. As successive repeaters are added to the high level side, the increase in the strength of the modulation products will disclose the faulty repeater.

In accordance with the test systems of the present invention, if a repeater develops a fault which does not affect the direct current path but does change the transmission performance, either by a small amount or to the extent of a complete interruption, transmission tests may be made by strapping out successive repeaters, thereby determining the particular repeater in trouble. Even in the case of complete interruption of the transmission circuit it is possible, after strapping the faulty repeater out of operation, to operate several message channels commercially by the use of companders at the terminals, that is, circuit devices responsive to maintain the volume of the transmitted signals substantially constant, such as disclosed in Patent 2,084,115 to D. M. Terry, June 15, 1937.

It will be apparent to those skilled in the art that systems in accordance with the present invention may be utilized to make other types of cable performance tests than the specific ones described herein.

What is claimed is:

1. In combination with an electrical signal transmission line including repeaters, and a source of energizing current for said repeaters located at one of the control stations of said signal transmission line, a test system which comprises means for varying the current from said source to produce a series of signals over said line, means respectively located at each one of a plurality of said repeaters which are responsive to a particular signal from said source to substantially shunt out the signal transmission path of said repeater from the normal transmission path of said transmission line, and means at one of the control stations of said transmission line to test the signal transmission of said transmission line including different combinations of said repeaters.

2. In combination with an electrical transmission line including repeaters, and a source of energizing current for said repeaters located at one of the control stations of said transmission line, a test system which comprises means for varying the current from said source to produce a series of signals over said line, a selector device located at each of a plurality of said repeaters, each of said selectors including means responsive to the signals from said source to move in synchronism through a series of steps, circuit connections in each of said repeaters which are actuated at a preselected step in each of said respective selector devices to substantially shunt out the signal transmission path of said repeater from the normal signal transmission path of said transmission line, and means comprising a transmission measuring set connected at one of the control stations of said transmission line to test the signal transmission of said transmission line with and without different ones of said repeaters included therein.

3. In combination with an electrical signal transmission path comprising an electrical transmission line including repeaters, and a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, and each of said selectors responsive to the interruptions in said energizing current to move in synchronism through a series of steps, means comprising circuit connections in each of said repeaters which are actuated at a preselected step in each of said respective selector devices for bypassing the signal transmission path through said repeater from the normal transmission path of said transmission line, and means comprising a transmission measuring set connected to at least one of the terminals of said transmission line for testing the signal transmission of said transmission line including different combinations of said repeaters.

4. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices to provide a signal by-pass around the said repeater, said circuit connections being at a different preselected step of said selector device in each of said repeaters whereby said circuit connections are actuated in each of said repeaters in response to a respectively different number of said interruptions, and means comprising a transmission measuring set connected to at least one of the terminals of said transmission line for testing the signal transmission of said transmission line including different combinations of said repeaters.

5. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices to provide a signal by-pass around the said repeater, said circuit connections being at a different preselected step of said selector device in each of said repeaters, whereby said circuit connections in each of said repeaters operate in response to a respectively different number of said interruptions, and in which certain alternate steps in all of the selector devices of said repeaters are free from said circuit connections, whereby none of said circuit connections is actuated in response to said alternate numbers of said interruptions, and means comprising a transmission measuring set connected to at least one of the terminals of said transmission line for testing the signal transmission of said transmission line including different combinations of said repeaters.

6. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices to provide a signal by-pass around the said repeater, said selector device in each of said repeaters comprising an electromagnet connected in series with the energizing circuit of said repeater, and means comprising a transmission measuring set connected to at least one of the terminals of said transmission line for testing the signal transmission of said transmission line including different combinations of said repeaters.

7. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices to provide a signal by-pass around the said repeater, said selector device in each of said repeaters comprising an electromagnet connected in series with the energizing circuit of said repeater, an armature responsive to move in accordance with the energization of said electromagnet, a cam responsive to rotate stepwise in synchronism with the motion of said armature, a switch, said cam shaped to operate said switch to actuate said current connections at a predetermined position in said rotation, and means comprising a transmission measuring set connected to at least one of the terminals of said transmission line for testing the signal transmission of said transmission line including different combinations of said repeaters.

8. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices to provide a signal by-pass around the said repeater, said selector device in each of said repeaters comprising an electromagnet connected in series with the energizing circuit of said repeater, an armature responsive to move in accordance with the energization of said electromagnet, a first cam responsive to rotate stepwise in synchronism with the motion of said armature, a second cam responsive to rotate stepwise in synchronism with the motion of said armature but at a different rate than the motion of said first cam, a switching means, said first and second cams shaped to operate said switching means after a predetermined number of rotational steps to actuate said circuit connections, and means comprising a transmission measuring set connected to at least one of the terminals of said transmission line for testing the signal transmission of said transmission line including different combinations of said repeaters.

9. In combination with an electrical signal transmission path comprising an electrical transmission line including repeaters, a source of energizing current for said repeaters located at one of the terminals of said transmission line, a test system which comprises means comprising a switch located at said terminal to interrupt the current transmitted from said source over said line, a selector device located at each of a plurality of the repeaters of said transmission line, each of said selector devices responsive to the interruptions in said energizing current to move in synchronism through a series of steps, means comprising circuit connections in each of said repeaters which are actuated at a preselected step in each of said selector devices for providing a signal by-pass around said repeater, means including circuit connections in each of said repeaters which are actuated at a preselected step in each of said selector devices preventing self-oscillation in said shunted-out repeater, and means comprising a transmission measuring set connected to at least one of the terminals of said transmission line for testing the signal transmission of said transmission line including different combinations of said repeaters.

10. In combination with an electrical transmission line including repeaters, a source of energizing current for said repeaters, said source connected to one of the terminals of said transmission line, a test system which comprises a switch in circuit relation to said source to interrupt the current therefrom, a selector device located at each of a plurality of the repeaters of said transmission system, said selector device comprising an electromagnetic relay having its windings in series with the energizing circuit for said repeaters, said relay operating in response to said interruptions, a cam responsive to the operation of said electromagnetic relay to rotate step-wise, a normally disconnected shunting circuit at each of the repeaters of said plurality for electrically coupling the input at said repeater to the output thereof, a normally inoperative signal current cut-off circuit at each of the repeaters of said plurality for preventing self-oscillation of said repeater during connection of said shunting circuit, switching means at each of the repeaters of said plurality responsive to respectively operate at a different predetermined step in the rotation of each of said respective cams to connect said shunting circuit and to operate said signal current cut-off circuit in each of said respective repeater circuits, and means comprising a transmission measuring set connected to at least one of the terminals of said transmission line for testing the performance of said transmission line including different combinations of said repeaters.

11. In combination with a repeatered electrical transmission line, a repeater having an output circuit and an input circuit, a normally disconnected signal transmission shunting circuit for directly connecting said input circuit to said output circuit, a normally inoperative signal current cut-off circuit included in said repeater circuit to prevent self-oscillation of said repeater during connection of said shunting circuit, and means including an electromagnetic relay at said repeater responsive to an electrical signal transmitted over said transmission line to connect said shunting circuit between said input and output circuits and to simultaneously operate said signal current cut-off circuit to prevent self-oscillation of said repeater.

12. A repeater circuit including signal input and output circuits which comprises in combination a normal signal transmission path connected between said signal input and output circuits, an auxiliary signal transmission path designed to provide a substantially fixed value of transmission through said repeater circuit from said input circuit to said output circuit independent of the gain of said normal signal transmission path, a switching device having a plurality of contactors, none of said contactors being included in said normal transmission path, and at least one of said contactors responsive to the operation of said switching device to connect said auxiliary signal transmission path between said input circuit and said output circuit.

13. A system in accordance with claim 12 in which said switching device operates in response to a signal from a remote point.

14. A system in accordance with claim 12 in which said switching device comprises a stepper device operative to close said contactor in only one of a plurality of positions.

15. A system comprising a transmission line having a plurality of repeaters in accordance with claim 12 in which the switching device in each of said repeaters comprises a stepping device including a contactor set on a respectively different step, means including a source of current connected to said line for supplying a series of stepping signals over said line, said stepping devices synchronized for stepping in unison by said signals, wherein the respective switch contactors in only one of said repeaters are closed at a time.

16. A system in accordance with claim 15 in which said stepping devices include step positions in which all of said repeaters are operated normally.

OLIVER B. JACOBS.

REFERENCES CITED

The following references are of record in the file of this patent:

UNITED STATES PATENTS

| Number | Name | Date |
|---|---|---|
| 1,829,803 | Korn | Nov. 3, 1937 |
| 2,260,160 | Benning | Oct. 21, 1941 |
| 2,315,434 | Leiber | Mar. 30, 1943 |
| 2,321,723 | Zinn | June 15, 1943 |
| 2,379,069 | Dysart | June 26, 1945 |
| 2,491,263 | Herrick | Dec. 13, 1949 |